Figure 1:
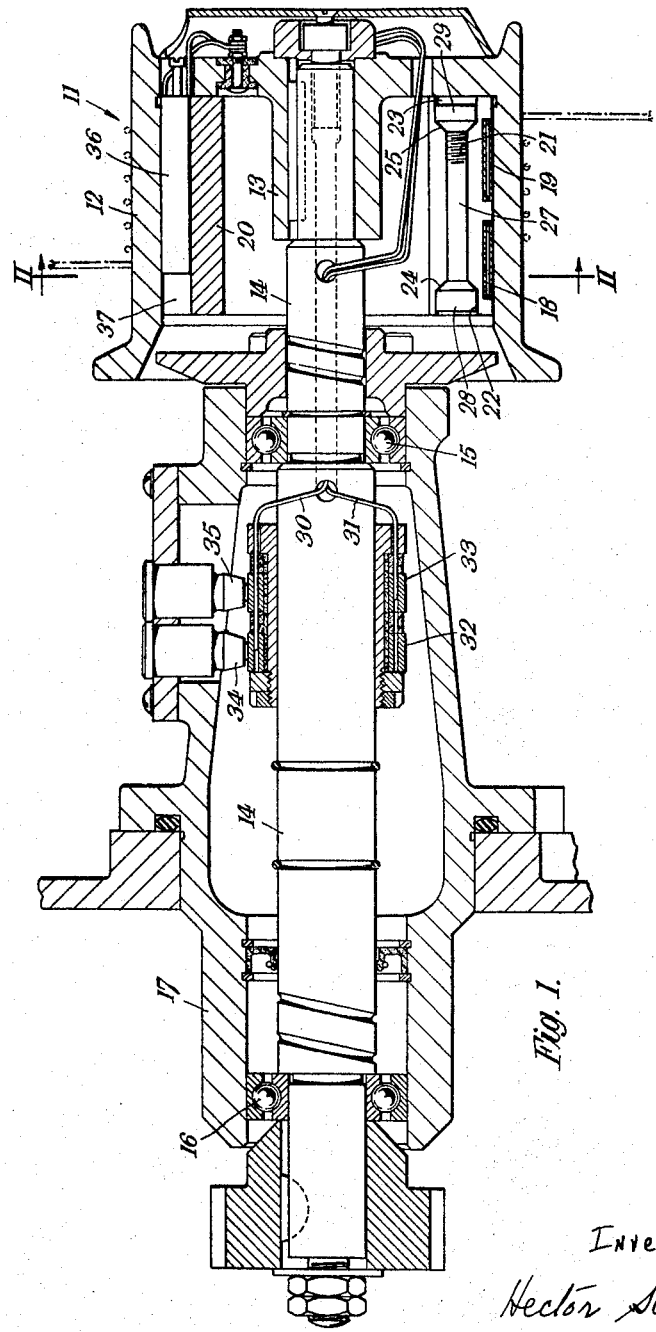

Nov. 15, 1966     H. SCOWCROFT     3,286,081
ELECTRICAL HEATING ARRANGEMENTS
Filed March 9, 1964     2 Sheets-Sheet 2

INVENTOR
Hector Scowcroft
BY Noele & Noele
Attorneys

United States Patent Office 3,286,081
Patented Nov. 15, 1966

3,286,081
ELECTRICAL HEATING ARRANGEMENTS
Hector Scowcroft, Bolton, England, assignor to T.M.M. (Research) Limited, Oldham, England, a British company
Filed Mar. 9, 1964, Ser. No. 350,457
Claims priority, application Great Britain, Mar. 8, 1963, 9,400/63
13 Claims. (Cl. 219—470)

The present invention relates to electrically heated rollers and is particularly, though not exclusively, concerned with such rollers used for heating travelling textile filaments or yarns.

On machines such as drawtwisters and draw winders heated draw rollers have been provided for treating synthetic filaments and it is, for example, known to provide a roller in the form of a hollow cylindrical shell fixedly mounted on a driving shaft in co-axial relation therewith and to mount an electric heater within the shell in a fixed position in relation to the machine frame supporting the roller shaft. It has, however, been found that the transfer of heat from the heater to the shell is adversely affected by the air gap which it is necessary to provide between the outer periphery of the heater and the inner periphery of the shell and in general this form of heating has been found unsatisfactory.

It is one object of the present invention to provide an electrically heated roller in which the electric heating element or elements are more effectively arranged to permit an easy transfer of heat to the shell and a good distribution of the heat throughout the shell.

According to the present invention there is provided an electrically heated roller comprising a shell of circular cross-section, one or more heating elements, and securing means for said element or elements arranged within the shell and movable into contact with the inner periphery of the shell to hold the heater element or elements in contact with the shell and rotatable therewith.

The securing means preferably comprises a deformable annular body arranged within the shell to support the said one or more heating elements and normally of such a size as to support the heating element or elements in an arrangement which is a sliding fit within the shell, and means circumferentially expanding the annular body within the shell so that the heating element or elements is or are held in contact with the inner periphery of the shell and rotatable therewith.

Preferably two heating elements are employed and these elements are mounted in the outer periphery of the annular body so as to be flush with the outer periphery, and the body is of such a size as to be a sliding fit within the shell prior to circumferential expansion. In a preferred embodiment of the invention means are provided for supplying energising current to one of the elements continuously and to the other element intermittently under the control of a thermostat.

Figure 2:
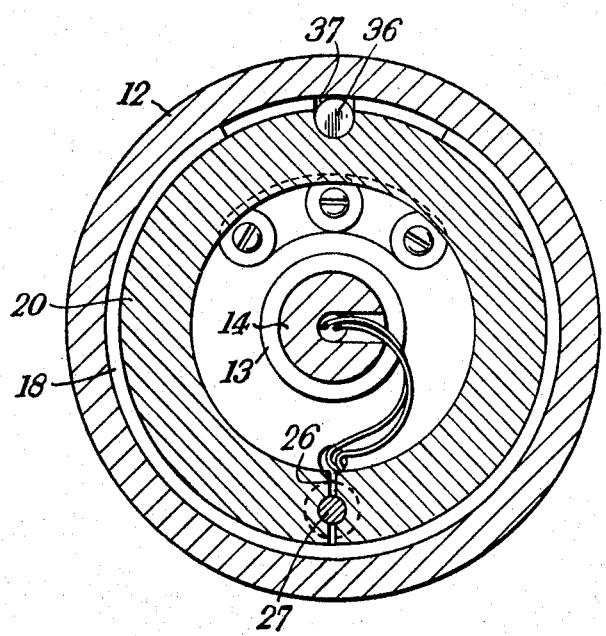

One embodiment of the invention will now be described by way of example with reference to the accompanying drawings in which, FIG. 1 is a cross-sectional side elevation of a heated roller according to the invention for employment in the heat treatment of synthetic filaments or yarns in a drawtwisting or draw winding machine, and FIG. 2 is a sectional end elevation of the roller shown in FIG. 1, taken on the line II—II in FIG. 1.

Referring to the drawings, a roller 11 takes the form of a cylindrical metal shell 12 which is closed at one end and is provided at the closed end with an internally extending co-axial bush 13 which is keyed on to the end of a roller-driving shaft 14 supported in spaced bearings 15 and 16 provided in the machine frame 17.

Two spaced electrical heating elements 18 and 19 are provided for heating the metal shell 12 and these elements are held in contact with the inner periphery of the shell 12 by an annular body 20 of cylindrical form which is mounted as a sliding fit within the shell 12 and which is subsequently circumferentially expanded so as to be held securely within the shell 12. The annular body 20 is drilled to provide a hole 21 extending along the length thereof in a direction parallel to the axis of the body 20 and the ends of the drilled hole 21 are counter-bored to a larger diameter to form recesses 22 and 23 having conical seatings 24 and 25. The body 20 is subsequently cut to provide a slit 26 which extends along a radial plane of the body, passing through the centre of the drilled hole 21 so that the body 20 takes the form of a split sleeve. A clamping screw 27 which is passed through the hole 21 is formed at one end with a head 28 which fits within the enlarged bore 22 and bears with a mating surface on the conical seat 24. The other end of the screw 27 is screw-threaded to receive a nut 29, which upon tightening bears down on the conical seat 25, such tightening causing the split annular body 20 circumferentially to expand.

The two electric heating elements 18 and 19 are mounted in recesses in the outer periphery of the annular body 20 so that each extends circumferentially round the body 20 and is flush with the outer periphery of the body 20. The elements 18 and 19, which are copper sheathed, are mounted in their recesses prior to insertion of the annular body 20 within the shell 12 and the arrangement is such that with nut 29 slack, the assembly forms a sliding fit within the shell 12. Subsequent tightening of the nut 29 causes the body 20 circumferentially to expand, bringing the outer surfaces of the heating elements 18 and 19 into contact with the inner periphery of the shell 12 and holding the annular body 20 securely within the shell 12.

Current is fed to the two heating elements 18 and 19 by electrically insulated conductors 30 and 31 carried through the interior of the driving shaft 14 and connected to spaced slip rings 32 and 33 mounted on the shaft 14 and supplied with current from contact brushes 34 and 35 fixedly mounted in the machine casing.

In the preferred arrangement illustrated in the drawing a thermostat 36 is mounted in a longitudinal recess 37 provided in the outer periphery of the annular body 20 at a position diametrically opposite to that of the clamping screw 27 so that when the annular body 20 is circumferentially expanded within the shell 12 the thermostat 36 is brought into contact with the inner periphery of the shell 12. The thermostat 36 is used to control the current fed to one of the electric heating elements, hereinafter referred to as the booster element, and the other heating element, hereinafter referred to as the basic element, is continuously fed with heating current to provide by itself a temperature level just below the required working temperature when the machine is not in operation. The booster element is of higher rating than the basic element and the thermostat is set to open the circuit of the booster element immediately the required working temperature is reached.

In operation, yarn passes round the outer periphery of the shell 12 which is driven at a predetermined speed. The elements 18 and 19 are supplied with current via slip rings 32 and 33 and the thermostat 36 controls the current supplied to the booster element to maintain the temperature of the shell at a predetermined working level. During operation, heat is constantly being removed from the shell 12 by the yarn and this heat is being made up by the booster element. If an end breaks down or if the machine is stopped, the thermostat will operate to switch off the booster element and the roller shell will fall to a temperature level just below the required working temperature as determined by the basic element. When the machine is in operation the booster element is continuously being switched on and off by the thermostat and in this way the working temperature can be maintained within very close limits.

It will be appreciated that the heating element may alternatively be controlled remotely by signals from other forms of temperature sensing device such as thermocouples or thermistors, which could be built into the annular bodies or the roller shells, the signals being fed via slip rings and brushes to a heater current control circuit.

What I claim as my invention and desire to secure by Letters Patent is:

1. An electrically heated roller comprising a shell having a circular cross-section, electrical resistance heating means, a deformable annular body arranged within said shell to support said resistance heating means, said annular body disposed to support said heating means in a sliding relationship within said shell, and means for circumferentially expanding the annular body within the shell and for causing said heating means to be held in rotatable contact with the inner periphery of said shell.

2. A roller according to claim 1, wherein said resistance heating means is mounted in said outer periphery of the annular body so as to be flush with said outer periphery and wherein the body slidably fits within the shell prior to circumferential expansion.

3. A roller according to claim 1, wherein the annular body is drilled to provide a hole extending along the length thereof in a direction parallel to the axis of the body and the body is cut to provide a slit therein which extends along a radial plane of the body passing through the centre of the drilled hole so that the body takes the form of a split sleeve, and wherein a clamping screw passes through the hole and is formed at one end with a head and carries at the other end a nut which upon tightening causes the split annular body circumferentially to expand.

4. A roller according to claim 3, wherein the ends of the drilled hole are counter-bored to a larger diameter to form recesses having conical seatings, wherein the head of the clamping screw fits within the enlarged bore at one end of the hole and bears with a mating surface on the conical seating, and wherein the nut fits within the enlarged bore at the other end of the hole and bears with a mating surface on the conical seating therein, whereby tightening of the nut on the screw produces circumferential expansion of the body.

5. A roller according to claim 4, wherein the electric heating means extends circumferentially around the body.

6. A roller according to claim 5 comprising a thermostat arranged in contact with the shell and rotatable therewith to control the supply of energising current to the resistance heating means.

7. A roller according to claim 6, wherein the thermostat is mounted in a longitudinal recess provided in the outer periphery of the annular body.

8. A roller according to claim 7, wherein resistance heating means terminates at positions spaced from the thermostat.

9. A roller according to claim 7, wherein the thermostat is mounted in the annular body at a position diametrically opposite to that of the clamping screw.

10. A roller according to claim 1, comprising a thermostat arranged in contact with the shell and rotatable therewith to control the supply of energising current to the resistance heating means.

11. A roller according to claim 10, wherein said resistance means comprises two elements and means are provided to supply energising current to one of said elements continuously and to the other said element intermittenly under the control of the thermostat.

12. A roller according to claim 11, wherein the rating of one of the heating elements is such as to maintain the shell at a temperature level just below the required working temperature when the roller is not in operation and the rating of the other element is such as to bring the shell to the required working temperature under the control of the thermostat.

13. Apparatus for heating travelling textile filaments and yarns comprising an electrically heated roller according to claim 1.

References Cited by the Examiner

UNITED STATES PATENTS

| | | | |
|---|---|---|---|
| 1,535,608 | 4/1925 | Johnson | 219—471 |
| 3,027,285 | 3/1962 | Eisner et al. | 219—470 |
| 3,200,230 | 10/1965 | De La Bretoniere | 219—10.61 |

FOREIGN PATENTS 992,436  5/1965  Great Britain.

RICHARD M. WOOD, *Primary Examiner.*

L. H. BENDER, *Assistant Examiner.*